UNITED STATES PATENT OFFICE.

RICHARD S. WARING, OF PITTSBURG, PENNSYLVANIA.

INSULATING MATERIAL AND PREPARATION OF THE SAME.

SPECIFICATION forming part of Letters Patent No. 284,098, dated August 28, 1883.

Application filed January 22, 1883. (No specimens.)

*To all whom it may concern:*

Be it known that I, RICHARD S. WARING, a citizen of the United States, residing at Pittsburg, county of Allegheny, State of Pennsylvania, have invented or discovered a new and useful Improvement in Insulating Material and the Preparation of the Same; and I do hereby declare the following to be a full, clear, concise, and exact description thereof.

My present invention relates to certain improvements in insulating material designed for use in making lead-covered electric cables; and in general terms it consists in an improved material for electric insulation and in the process of preparing the same to adapt it to the peculiar requirements of its designed use, as hereinafter more fully described and claimed.

In the manufacture of lead-covered electric cables, especially that class having two or more insulated conductors inclosed within separate tubular passages in a common body of lead, it is usual to employ copper wires for the conductors, which in preparation are first covered with woven or braided fiber, and then coated with some electric insulating substance—such as paraffine or other hydrocarbon compounds—applied usually in liquid form.

In covering such insulated wires with lead they are passed through the tubular core or mandrel of a lead-press. Molten lead—say above 600° temperature Fahrenheit—is run into the cylinder of the press and allowed to "set," when—say at from 300° to 400° temperature—it is pressed out of the cylinder through a die onto and around the wires, completely inclosing them by a highly-heated body of lead.

It is an essential condition to the successful working of such cables, owing to the close proximity of the wires and lead covering, that the insulating material should be preserved intact without blow-holes, faults, or other defects which might permit escape of electric force from the wires to the lead; also, that the lead body should in like manner be free from flaws, blow-holes, or other like defects which might expose the wires to the action of outside agencies, and that the wires, insulating material, and tubular walls of lead which surround the wires should be perfectly dry and free from aqueous moisture.

In order to secure these conditions in the finished cable, it is primarily essential that the insulating material employed should be free from moisture, from air or other fixed gases, and from compounds liable to become volatilized or decomposed into constituent elements—hydrogen and carbon—under the influence of the high heat to which the material is exposed in applying the lead covering. If volatile vapors or gases be set free or developed during or after the application of the hot lead, they will form blow-holes, flaws, or faults either in the body of insulating material or in the lead, or in both, rendering it unfit for the purposes intended; also, in the application of the hot lead covering, a sensible degree of electric tension is developed or excited between the lead covering and the inclosed conductors, sufficient to produce an appreciable current of electricity over a conducting-wire connecting such parts. If easily decomposed compounds are present in the insulating material, they may be broken up into constituent elements, setting hydrogen free, which in nascent state is liable to combine with oxygen, if any be present from the air or other source, thereby forming water in the operation of applying the lead covering, even though none be present in the materials before such covering is applied.

While I am not prepared to say that such formation of water actually takes place, yet I have observed aqueous deposits on the tubular surface of the lead surrounding the insulation of the wires, attended with evidences of electrolytic action, which strongly suggest that such aqueous matter was formed there and not inserted in such form with the materials of the cable. The presence of water in the cable is highly objectionable, from whatever source it may appear, not only because insulation is weakened thereby, but also because its presence supplies, with the other materials of the cable, the necessary conditions for exciting electrical action, either primarily as an independent battery, or secondarily as a reaction from effects produced by transmission of electric currents through the copper wires. Such electrical action may sometimes be made sensible by a galvanometer connected in the line of a defective cable containing water, such cable being unconnected with any apparent electric exciter outside of the cable itself.

With paraffine and other similar hydrocarbon compounds prepared as commonly practiced in the art, these objectionable features and conditions are present to such extent as to render it extremely difficult, requiring a high degree of skill, to make this class of cables sufficiently perfect for practical and general use.

After continued experiments, tests, and careful observation of the apparent phenomena, both in making the cable in the press and in use of the same, I have discovered that the difficulties above described are due primarily to the presence of watery vapor, air, and also of light, volatile, and easily-decomposed compounds in the insulating material; and the purpose of my present invention is to provide a hydrocarbon insulating material having a comparatively high vaporizing-point free from elements liable to be volatilized or decomposed under the heat and force to which it is exposed in applying lead in a press—say 300° to 400° temperature—also free from water or watery vapor, and of such density as to exclude air and other fixed gases to a great degree.

In the preparation of such insulating material I may employ natural asphaltum, tar, pitch, or products of petroleum distillation. I prefer the latter on account of freedom from foreign matter, which impairs the good properties of the material as an electrical insulator. If the products of petroleum are employed, they may be obtained by distillation or evaporation carefully conducted, so as to avoid, as far as possible, cracking, burning, and formation of coke. In this way the material is reduced either directly or by repeated redistillations to a consistence such that it will congeal when cold, but be elastic and pliable, not brittle or resinous. This condition may be secured either in the distillate at the last or final stages of distillation or as a residual product. I prefer the latter on account of the uniformity of its consistency, its greater density and body, and freedom from light and easily-decomposed compounds, which always characterize or are present to a greater or less extent in the distillates. In order to prepare the product thus obtained for use as an insulator, as above described, it is transferred from the still or reducing-vessel to another, preferably an open vessel or a "vacuum-still," so called, in order to lessen, as much as possible, atmospheric pressure upon the surface of the material. The material is then carefully reheated in such vessel or still for the purpose of eliminating watery vapor, moist or dry air, or other gases, and light or easily-decomposed elements or compounds, which would be liable to be set free or vaporized under the heat of lead as it is applied, or, for greater safety, which would be vaporized or set free at, say, 350° or 400° Fahrenheit. This reheating should be conducted with care, to avoid destructive distillation or cracking, which would not only form coke in the material, but also new compounds of unstable character liable to be again decomposed at even much lower heat than that at which they were formed. A great variety of these unstable compounds may be formed in redistillation by repeated breaking up or decomposition and recombination, and they are usually present in the products of the last stages of distillation to a considerable amount, but more especially in the distillates.

One important purpose of the careful reheating above described is to eliminate such easily-decomposed compounds, avoiding at the same time the formation of new ones. The product thus prepared is much better adapted for the purposes described than lighter products—as paraffine—or the heavier products not treated by such reheating.

In applying such material to the fiber-coated wires, the fibrous coating should be thoroughly dried to free it from all moisture, and then dipped directly into or passed through a bath of the melted material maintained at such temperature—say a little above the melting-point—as not to endanger the fibrous coating by burning or charring on exposure to the air. Suitable means are known in the art for this purpose and need not be described in detail.

Wires coated with this material may be used with most satisfactory results in making cables, as above described, such cables being now in practical use.

The degree of insulation or resistance secured by this material in such cables is beyond the capacity of measurement of instruments commonly employed by electricians. In a portion of the cable in actual use, above referred to, containing conducting-wires two and one-half miles in length, the measurement of resistance or insulation has been shown by actual tests made by skilled electricians to be above or over one hundred and twenty megohms per mile.

While I prefer to employ the heavy products of petroleum in making my improved material, as above described, still the process by which the material is prepared may be employed to advantage in preparing other hydrocarbon materials containing light and easily-decomposed compounds, and such application of the process I consider as coming within my invention.

I make no claim herein to a lead-covered cable having conducting-wires insulated with my improved material, nor to the insulated conductors, alone considered, as the same, in so far as they contain patentable invention, will form the subject-matter of separate applications for patents.

I claim herein as my invention—

1. An electric insulating material consisting of a hydrocarbon compound, solid, elastic, and pliable when cold, deprived by reheating, without "cracking," of light, volatile, and easily-decomposed compounds and watery vapor, substantially as set forth.

2. An electric insulating material composed of a final product of petroleum distillation, solid, elastic, and pliable when cold, freed from watery vapor and compounds which are vaporized or decomposed under the temperature of lead as applied to wires in a press for forming lead-covered electric cables, substantially as set forth.

3. The process of preparing an insulating material for use in insulating electric conductors for lead-covered cables from natural asphaltum, or the heavier distillates or residual products of petroleum or equivalent hydrocarbon compounds, by subjecting the same to a degree of heat above the vaporizing-point of water, for the purpose of eliminating the latter, and also above the point at which the light and easily-decomposed products are driven off, (approximately 350° Fahrenheit,) but below the point at which destructive distillation or cracking begins, substantially as described.

In testimony whereof I have hereunto set my hand.

RICHARD S. WARING.

Witnesses:
   C. L. PARKER,
   R. H. WHITTLESEY.